(12) United States Patent
Jung

(10) Patent No.: US 8,471,968 B2
(45) Date of Patent: Jun. 25, 2013

(54) LIQUID CRYSTAL PANEL HAVING A LIGHT REFRACTING DEVICE, AND DISPLAY DEVICE HAVING LIQUID CRYSTAL PANEL

(75) Inventor: Jin Hee Jung, Anyang-Si (KR)

(73) Assignee: LG Display Co., Ltd., Seoul (KR)

( * ) Notice: Subject to any disclaimer, the term of this patent is extended or adjusted under 35 U.S.C. 154(b) by 1026 days.

(21) Appl. No.: 11/442,118

(22) Filed: May 30, 2006

(65) Prior Publication Data
US 2006/0268196 A1 Nov. 30, 2006

(30) Foreign Application Priority Data

May 31, 2005 (KR) .................. 10-2005-0045918

(51) Int. Cl.
*G02F 1/133* (2006.01)
*G02F 1/1335* (2006.01)
*G02B 27/22* (2006.01)

(52) U.S. Cl.
USPC ............... 349/15; 349/95; 359/462; 359/463

(58) Field of Classification Search
USPC ............... 349/95, 15; 359/462–463
See application file for complete search history.

(56) References Cited

U.S. PATENT DOCUMENTS

| | | | | |
|---|---|---|---|---|
| 5,631,754 A | * | 5/1997 | Jannson et al. | 349/64 |
| 5,844,644 A | * | 12/1998 | Oh et al. | 349/95 |
| 6,295,107 B1 | * | 9/2001 | Watanabe et al. | 349/95 |
| 7,532,272 B2 | * | 5/2009 | Woodgate et al. | 349/95 |

FOREIGN PATENT DOCUMENTS

| | | | |
|---|---|---|---|
| JP | 09-203980 | * | 5/1997 |
| JP | 09-203980 A | | 8/1997 |
| KR | 10-2003-0022581 A | | 3/2003 |
| KR | 10-2004-0035722 A | | 4/2004 |

\* cited by examiner

*Primary Examiner* — Lauren Nguyen
(74) *Attorney, Agent, or Firm* — Birch, Stewart, Kolasch & Birch, LLP

(57) ABSTRACT

A liquid crystal panel includes a first substrate and a second substrate; a first electrode on a surface of the first substrate; a light refraction device on the second substrate, the light refraction device including a plurality of light refracting lenses facing the surface of the first substrate; and a liquid crystal layer interposed between the first electrode and the light refracting lenses.

19 Claims, 7 Drawing Sheets

LIQUID CRYSTAL PANEL HAVING A LIGHT REFRACTING DEVICE, AND DISPLAY DEVICE HAVING LIQUID CRYSTAL PANEL

This Nonprovisional Application claims priority under 35 U.S.C. §119(a) on Patent Application No. 10-2005-0045918 filed in Korea on May 31, 2005, the entire contents of which are hereby incorporated by reference.

BACKGROUND OF THE INVENTION

1. Field of the Invention

The present invention relates to a display device, and more particularly, to a display device to which a lenticular method is applied and capable of selectively displaying one of a two-dimensional (2D) image and a three-dimensional (3D) image.

2. Description of the Related Art

A demand for virtual reality in multimedia technologies increases. Also, 3D visualization of diagnosis and measurement is developing. Therefore, a demand for a display device that can display an image in a three-dimensional way increases.

The application of the 3D display technologies can apply to 3D displays for advertisements, 3D multimedia image display terminals for home use, 3D simulators and image display terminals for education and training, visualization image display terminals for various precise measurements and diagnosis, 3D image display terminals for medical use, 3D image display terminals for various supervision and controls, 3D image monitors for video conference and advertisements, 3D television sets for broadcasting, 3D image display terminals for education and entertainments, parts for manufacturing various special environments, and image devices for 3D games.

Technologies required for a general 3D display device include technologies for designing and manufacturing an optical plate for forming a visual field, for example, a lenticular lens plate or a microlens plate, and driving control technologies for realizing a pixel pattern that corresponds to visual field formation on a display device.

Methods for displaying a 3D image include methods using two (2) viewpoints (where an image for a left eye and an image for a right eye are displayed, respectively) and methods using multiple viewpoints (where binocular parallax image photographed at various directions are displayed). The methods using the multiple viewpoints have a disadvantage that the resolution is in inverse proportion to the number of viewpoints, but provide a greater degree of freedom in a viewing position, so that a natural 3D image can be viewed.

Representative non-glasses methods where image data for a left eye and a right eye are separated for the corresponding left eye and right eye include a parallax barrier method and a lenticular lens method.

FIG. 1 is an exploded perspective view of a related art lenticular type display device. As illustrated in FIG. 1, a plurality of lenticular lenses are provided on an outer surface of a flat panel display 100 such as a liquid crystal display device (LCD). A lenticular lens substrate 110 is located such that the lenticular lenses 112 are arranged on a subpixel array of red, green, and blue subpixels constituting one color pixel in the flat panel display 100, so that horizontal and vertical parallaxes are realized.

FIG. 2 is a view explaining how a 3D image is realized using the lenticular method as illustrated in FIG. 1. A lenticular method realizing a 3D image in a flat panel display will be described with reference to FIG. 2.

The lenticular method uses a parallax principle of a left eye and a right eye, which enables a person to experience three-dimensional visualization of an object. Image data (at least two viewpoints) for a left eye and a right eye regarding an object are input to the flat panel display 100, and a plurality of these data are refracted by the lenticular lenses 112 and viewed at the corresponding left eye and right eye, respectively. The image data refracted by the lenticular lenses 112 are synthesized at a human brain, so that a 3D image is realized.

That is, according to a principle realizing a 3D image on a 2D plane screen, two image data are input on a screen, and an image for a left eye and an image for a right eye are separately viewed by the corresponding left eye and right eye, respectively.

However, a related art lenticular type 3D display device requires a fixed lens-shaped plate attached on the flat panel display 100 in order to display a 3D image. Therefore, this arrangement is only suitable for displaying a 3D image, but not suitable for displaying a 2D image. Because currently most of the image and video streams are for a 2D mode, the related art 3D display device is usable for limited 3D image and video streams and cannot be used to display conventional 2D image and video streams.

SUMMARY OF THE INVENTION

Accordingly, the present invention is directed to a liquid crystal panel, a display device having a liquid crystal panel, and a driving method thereof that substantially obviate one or more problems due to limitations and disadvantages of the related art.

An object of the present invention is to provide a two and three-dimensional image panel in front of a flat panel display, capable of selectively displaying a 2D image or a 3D image by providing liquid crystal (LC) and a plurality of lens cells inside the two and three-dimensional image panel to allow the lens cells to perform a lenticular lens function depending on whether a power source is applied to the LC.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal panel includes a first substrate and a second substrate; a first electrode on a surface of the first substrate; a light refraction device on the second substrate, the light refraction device including a plurality of light refracting lenses facing the surface of the first substrate; and a liquid crystal layer interposed between the first electrode and the light refracting lenses.

In another aspect of the present invention, as embodied, a display device for selectively displaying one of a two-dimensional image and a three-dimensional image is provided to include a flat panel display for displaying at least one image; and a two and three-dimensional image panel, the two and three-dimensional image panel either refracting the at least one image from the flat panel display to display the three-dimensional image or passing the at least one image from the flat panel display to display the two-dimensional image, depending on whether an electric field is applied to the two and three-dimensional image panel.

In another aspect of the present invention, as embodied, a method of selectively displaying one of a two-dimensional image and a three-dimensional image is provided to include: outputting at least one image from a flat panel display; receiving the at least one image by a two and three-dimensional image panel; and either refracting the at least one image from the flat panel display by the two and three-dimensional image panel to display the three-dimensional image or passing the at least one image from the flat panel display by the two and three-dimensional image panel to display the two-dimensional image, depending on whether an electric field is applied to the two and three-dimensional image panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the preferred embodiments of the present invention, examples of which are illustrated in the accompanying drawings.

Figure 1:
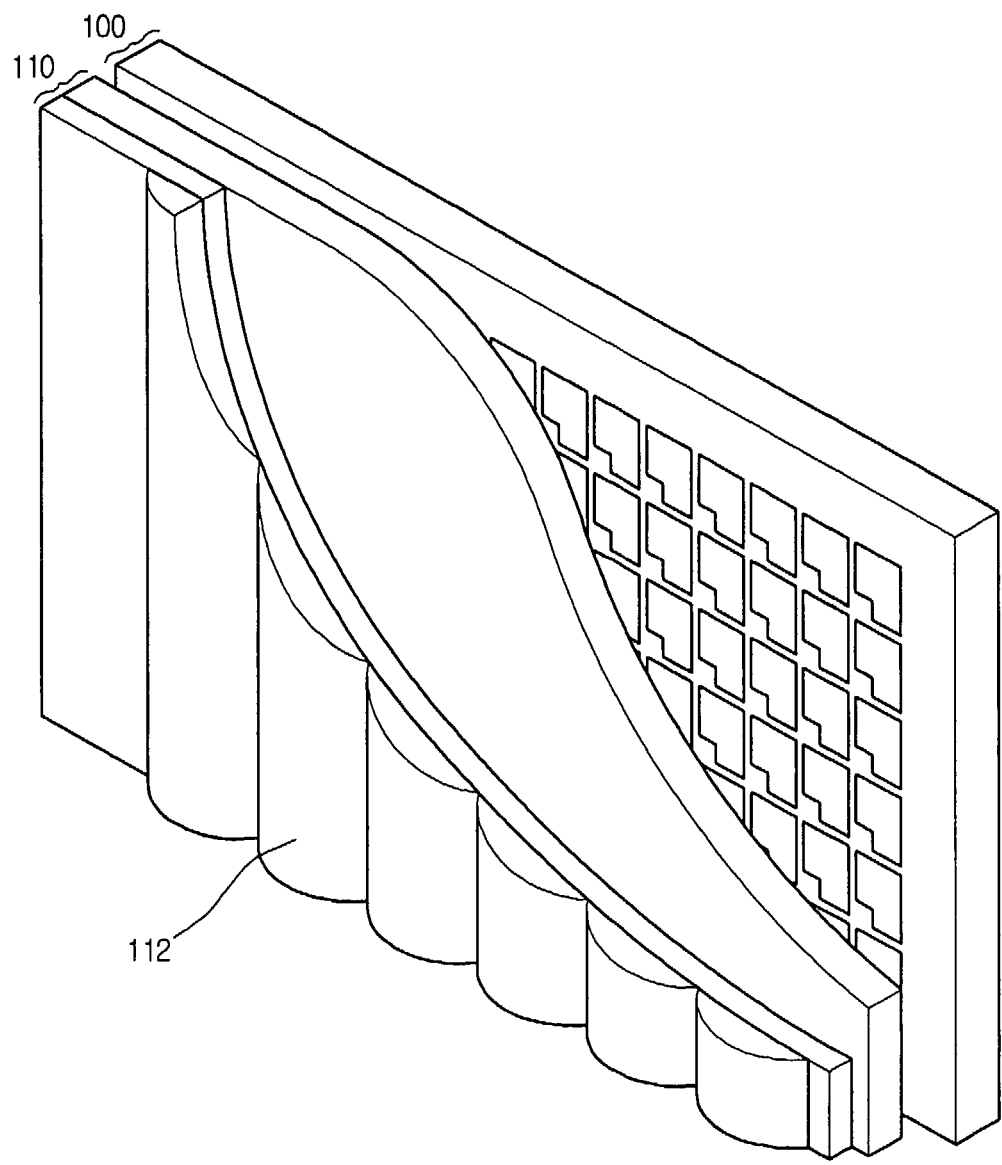
FIG. 1 is an exploded perspective view of a related art lenticular type display device.
Figure 2:
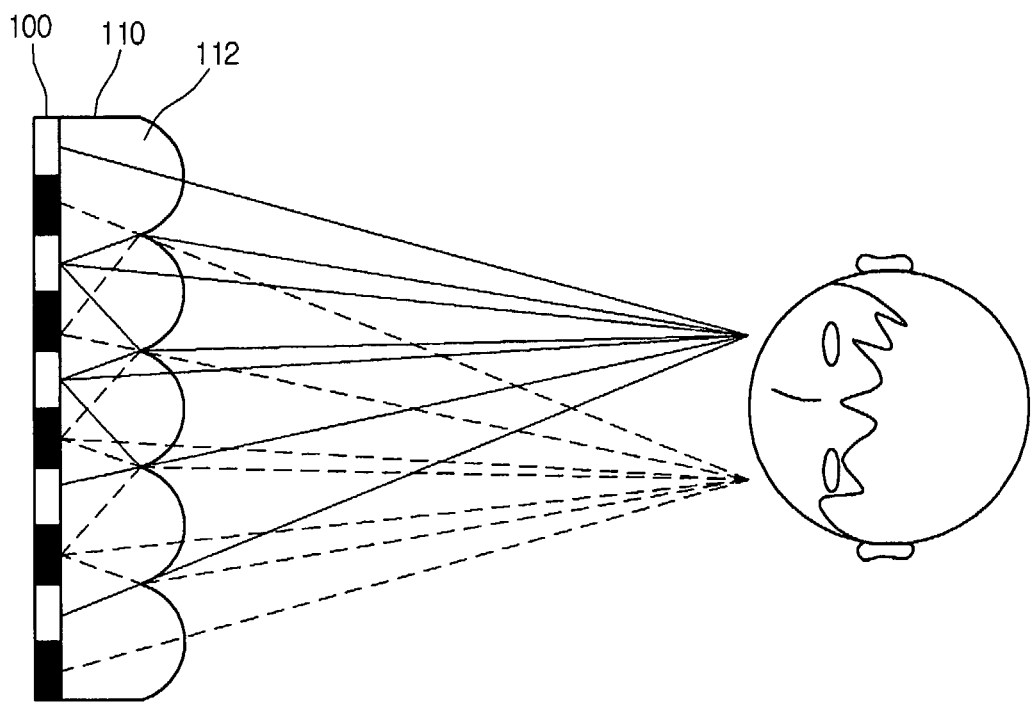
FIG. 2 is a view explaining a 3D image realized using the lenticular method illustrated in FIG. 1.
Figure 3A:
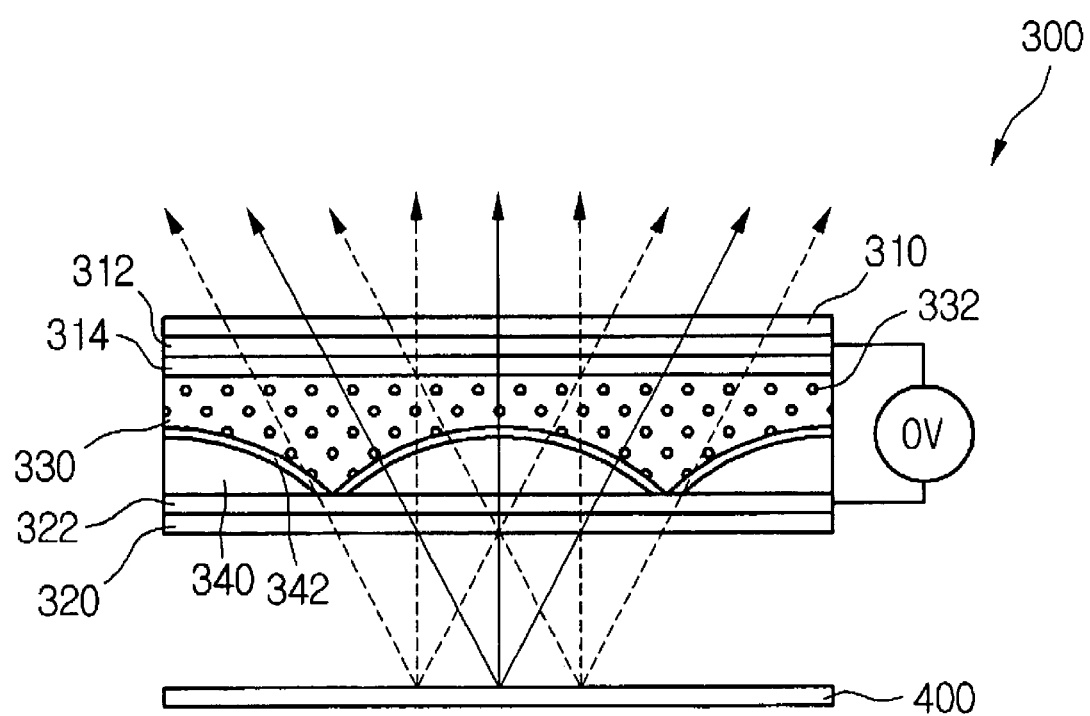
FIGS. 3A and 3B are cross-sectional views of a two and three-dimensional image panel according to an embodiment of the present invention.
Figure 3B:
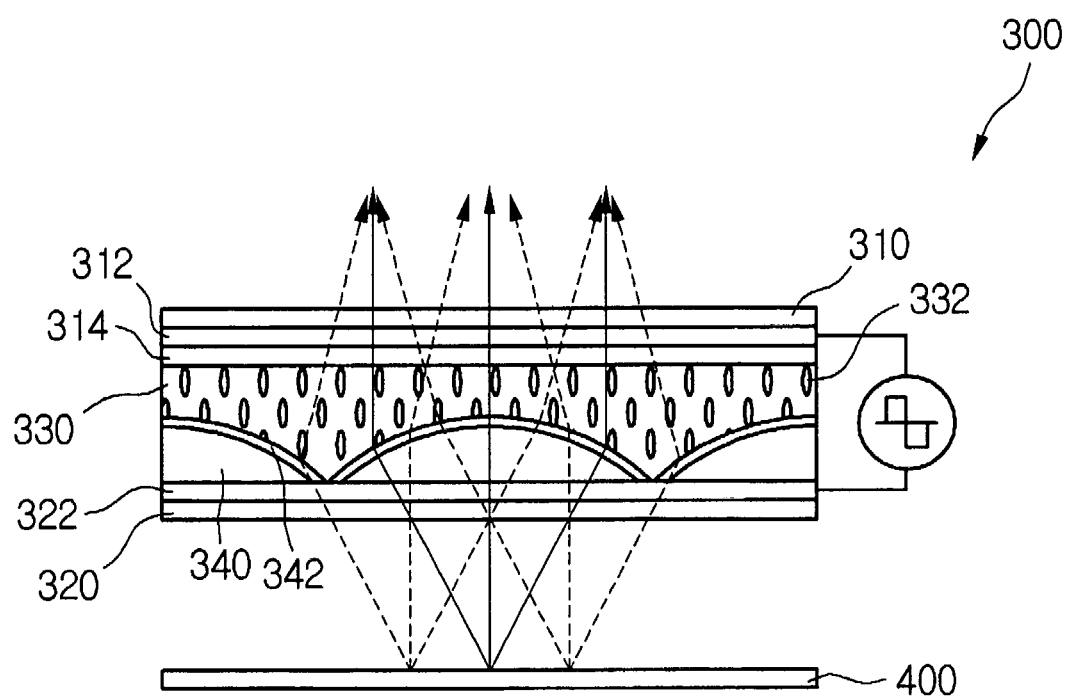

FIGS. 3A and 3B are cross-sectional views of a two and three-dimensional image panel according to an embodiment of the present invention. Specifically, FIG. 3A illustrates a state when the power is not applied to the electrodes on both substrates, and FIG. 3B illustrates a state when the power is applied to the electrodes on both substrates.

In the illustrated embodiment, the two and three-dimensional image panel can selectively perform the function as that of a lenticular lens substrate provided in a lenticular method to display a 3D image when the power is applied, and selectively disable the lenticular lens function in order to display a 2D image output from a flat panel display when the power is not applied.

The two and three-dimensional image panel is located in front of the flat panel display to selectively display a 2D image or a 3D image depending on the application of the power to the two and three-dimensional image panel. Therefore, the user can choose to enable the 3D image displaying function when the 3D image and video streams are broadcasted or played, and disable the 3D image displaying function when the 2D image and video streams are broadcasted or played by controlling the application of the power to the two and three-dimensional image panel.

Referring to FIG. 3, the two and three-dimensional image panel 300 includes a first substrate 310 and a second substrate 320 that are transparent substrates and arranged to face each other; a first electrode 312 formed on an entire surface of the first substrate 310; a first alignment layer 314 formed on an entire surface of the first electrode; a second electrode 322 formed on an entire surface of the second substrate 320; a light refraction device made of a lens-shaped polymer material 340 to have a plurality of light refracting lenses uniformly located on the second electrode 322; a second alignment layer 342 formed on an outer surface of the polymer material 340; and an liquid crystal layer 330 filled in a space between the first alignment layer 314 and the second alignment layer 342. Since the two and three-dimensional image panel 300 includes the liquid crystal layer between the substrates, it can be called a liquid crystal panel.

Here, a light refractive index of the lens-shaped polymer material 340 is the same as that of the liquid crystal layer 330 when an electric field is not applied to the liquid crystal layer 330, that is, when the liquid crystal layer 330 is in an initial alignment state.

Also, when an outer surface of the polymer material 340 is rubbed and aligned in a predetermined direction, the second alignment layer 342 may be omitted.

An operation when the voltage is not applied to the electrodes provided on both sides of the two and three-dimensional image panel 300 will be described below with reference to FIG. 3A. Referring to FIG. 3A, when the voltage is not applied to the electrodes 312 and 322 provided on both the substrates 310 and 320, the liquid crystal molecules 332 contained in the liquid crystal layer 330 and aligned in an initial alignment direction using the first and second alignment layers 314 and 342 maintains the initial alignment direction. At this point, since the light refractive index of the lens-shaped polymer material 340 is the same as that of the initially aligned liquid crystal layer 330, the two and three-dimensional image panel 300 substantially serves as a transparent substrate to pass the image and video streams from the flat panel display 400.

For example, assuming that a flat panel display 400 is an LCD, an incident angle's axis of light from the LCD is parallel to an optical axis of the LC 332 contained in the liquid crystal layer 330. Therefore, a 2D image from the LCD directly passes through the two and three-dimensional image panel 300 to realize a 2D image.

On the other hand, when the voltage is applied to the electrodes 312 and 322 provided on the two substrates 310 and 320 of the two and three-dimensional image panel 300, the liquid crystal molecules 332 are erected as shown in FIG. 3B due to the electric field on the liquid crystal molecules 332. Therefore, a light refractive index of the lens-shaped polymer material 340 becomes greater than that of the liquid crystal layer 330.

That is, the lens-shaped polymer material 340 performs the same function as that of a lenticular lens provided in a related art lenticular method realizing a 3D image, thereby displaying a 3D image.

For example, light from the flat panel display 400 passes through the two and three-dimensional image panel 300 and realizes horizontal parallax using the convex surfaces of the light refracting lenses made of the polymer material 340. That is, the image data are divided into left-eye information and right-eye information through the lens-shaped polymer material 340. Therefore, a left eye and a right eye view different information. Different information (image data) separated by the lens-shaped polymer material 340 is synthesized by a human brain, so that a human feels an image as a 3D image.

Therefore, in the illustrated embodiment, the user can choose to enable the 3D image displaying function when the 3D image and video streams are broadcasted or played by turning on the power to apply an electric field to the liquid crystal layer of the two and three-dimensional image panel 300, and disable the 3D image displaying function when the 2D image and video streams are broadcasted or played by turning off the power. Accordingly, the power consumption is minimized when only a 2D image and video stream is displayed.

Figure 4A:
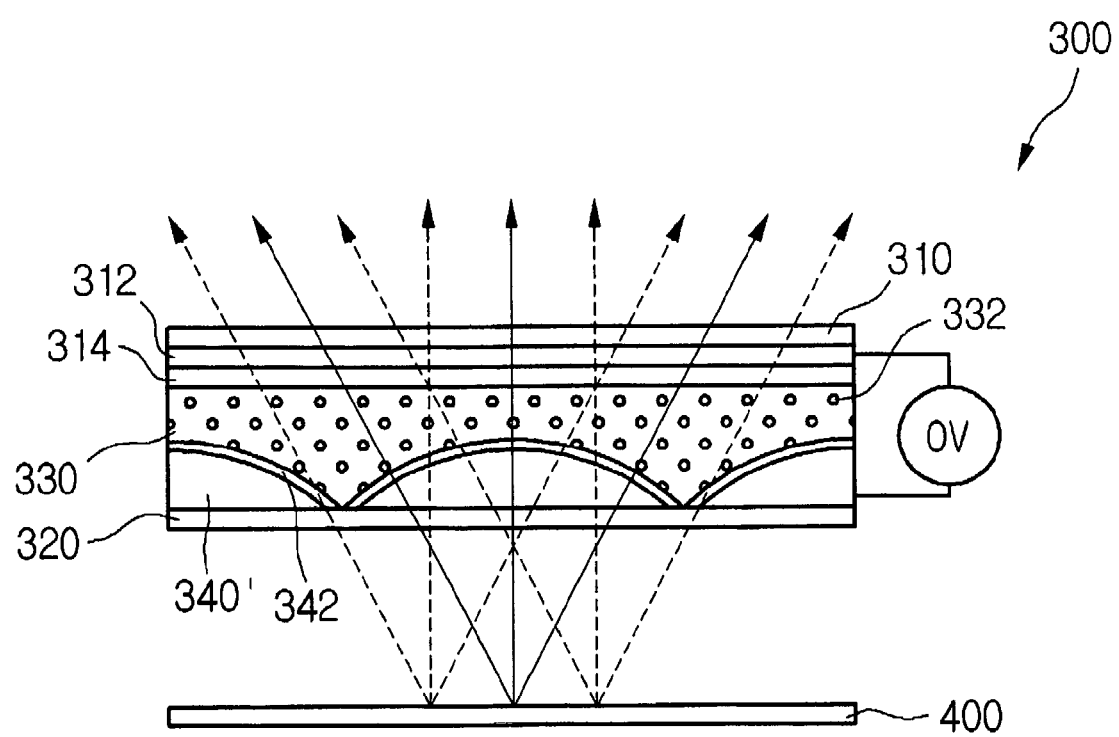
FIGS. 4A and 4B are cross-sectional views of a two and three-dimensional image panel according to another embodiment of the present invention.
Figure 4B:
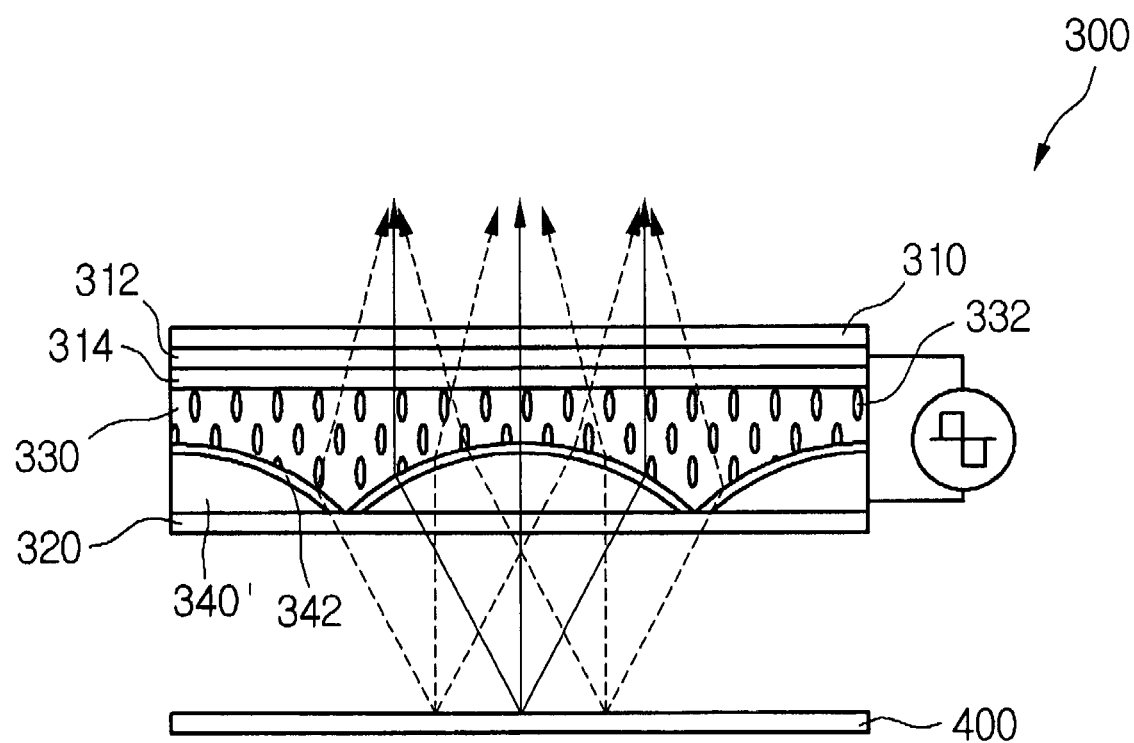

FIGS. 4A and 4B are cross-sectional views of a two and three-dimensional image panel 300 according to another embodiment of the present invention. Specifically, FIG. 4A illustrates a state when the voltage is not applied to both electrodes of substrates, and FIG. 4B illustrates a state when the voltage is applied to both electrodes of the substrates.

Referring to FIG. 4, the two and three-dimensional image panel 300 includes: a first substrate 310 and a second substrate 320 that are transparent substrates and arranged to face each other; a first electrode 312 formed on an entire surface of the first substrate 310; a first alignment layer 314 formed on an entire surface of the first electrode 312; a conductive polymer material 340' uniformly disposed on the second substrate 320; a second alignment layer 342 formed on an outer surface of the conductive polymer material 340'; and an liquid crystal layer 330 filled in a space formed between the first alignment layer 314 and the second alignment layer 342.

The embodiment illustrated in FIG. 4 is different from the embodiment illustrated in FIG. 3 in that the second electrode 322 (of FIG. 3) formed on the second substrate is removed and the lens-shaped polymer material 340 (of FIG. 3) is formed of a conductive polymer material 340' to serves as both the second electrode and the light refracting lenses.

Here, a light refractive index of the lens-shaped conductive polymer material 340' is the same as that of the liquid crystal layer 340 when an electric field is not applied to the liquid crystal layer 330, that is, when the liquid crystal layer 330 is in an initial alignment state.

In addition, when an outer surface of the polymer material is rubbed so that the polymer material is aligned to a predetermined direction, the second alignment layer 342 may be omitted.

Since the operation of the two and three-dimensional image panel 300 illustrated in FIGS. 4A and 4B is almost the same as that of the embodiment illustrated in FIGS. 3A and 3B, detailed descriptions thereof will be omitted.

Figure 5:
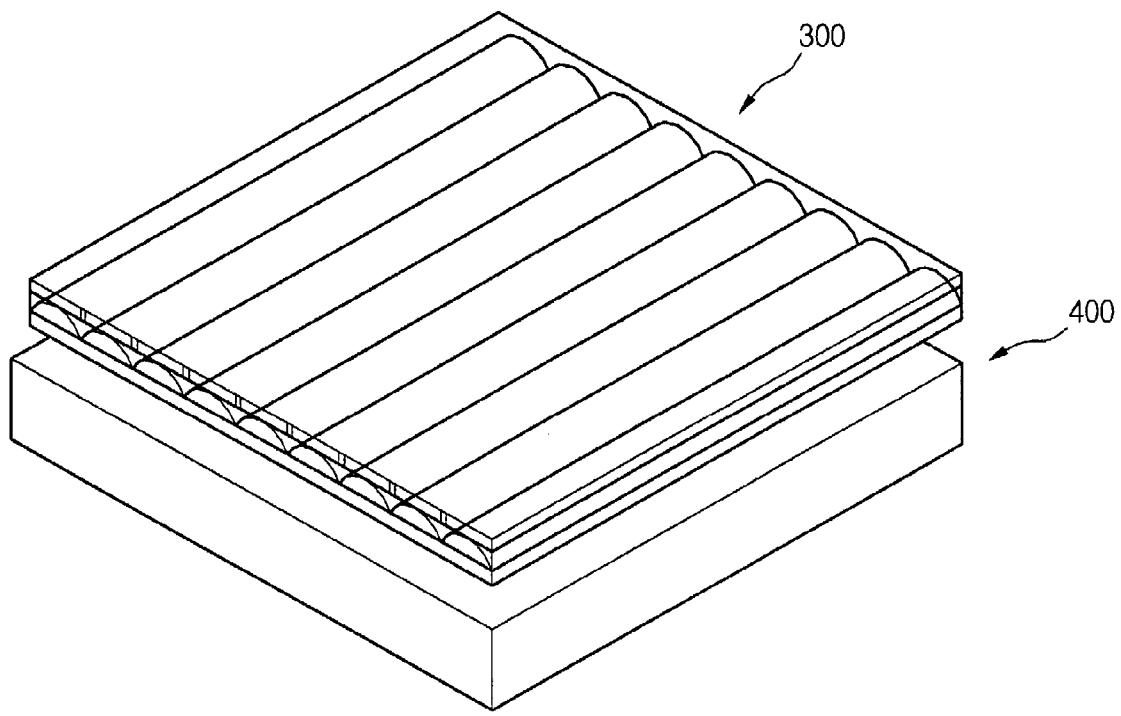
FIG. 5 is a perspective view of a display device for selectively displaying a 2D image or a 3D image according to an embodiment of the present invention.

FIG. 5 is a perspective view of a display device for selectively displaying a 2D image or a 3D image according to an embodiment of the present invention. As shown in FIG. 5, the two and three-dimensional image panel 300 is located in front of or attached to the flat panel display 400. Therefore, a display device for selectively displaying a 2D image or a 3D image using a lenticular method is realized.

Here, the flat panel display may be one of an LCD (liquid crystal display device), a PDP (plasma display panel), an FED (field emission display device), and an organic EL (electroluminance) panel. A separate polarizing plate for a 3D image display may be interposed between the two and three-dimensional image panel 300 and the flat panel display if the flat panel display is not an LCD device.

The illustrated display device includes a flat panel display and a two and three-dimensional image panel that has the liquid crystal layer and a lens-shaped polymer material. when the electric field is applied to the liquid crystal layer, a refractive index of the liquid crystal layer becomes the same as that of the lens-shaped polymer material, so that an image from the flat panel display is output as a 2D image. On the other hand, when the electric field is applied to the liquid crystal layer, the refractive index of the LC becomes different from that of the lens-shaped polymer material, so that an image from the flat panel display is output as a 3D image.

More specifically, in the illustrated embodiments, when the electric field is not applied to the liquid crystal layer, the refractive index of the liquid crystal layer is substantially the same as the refractive index of the light refraction device. Therefore, no refraction occurs at an interface between the light refraction device and the liquid crystal layer. Accordingly, the image from the flat panel display will pass the two and three-dimensional image panel so as to display a 2D image. On the other hand, when the electric field is applied to the liquid crystal layer, the refractive index of the liquid crystal layer is changed to be different from the refractive index of the light refraction device. Therefore, the image from the flat panel display is refracted at the interface between the light refraction device and liquid crystal layer so as to display a 3D image.

Therefore, a 2D image or a 3D image is selectively displayed by controlling the electric field applied to the liquid crystal layer. In addition, the power consumption is reduced when only a 2D image is displayed.

It should be noted that although in the illustrated embodiments the 3D image displaying function is enabled when the power is applied and is disabled when the power is not applied, it still fails within the scope of the present invention by re-arrange the initial alignment direction of the liquid crystal material in the two and three-dimensional image panel so that the 3D image displaying function is enabled when the power is not applied and is disabled when the power is applied, or the 3D image displaying function is enabled when a particular voltage is applied and is disabled when another particular voltage is applied.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal panel comprising;
    a first substrate and a second substrate facing each other;
    a first electrode on an inner surface of the first substrate;
    a first alignment layer located on substantially an entire surface of the first electrode;
    a light refraction device on an inner surface of the second substrate, the light refraction device including a plurality of light refracting lenses facing the first electrode, wherein each of the plurality of light refracting lenses includes a part-cylindrical lens, the part-cylindrical lens having a convex top surface and a substantially flat bottom surface, the convex top surface facing the inner surface of the first substrate, and the substantially flat bottom surface facing the second substrate;
    a second alignment layer formed along the convex top surfaces of the part-cylindrical lenses, and having an outer surface facing the inner surface of first substrate, wherein the outer surface of the second alignment layer has a plurality of convex portions that face the first substrate;
    a second electrode formed between the second substrate and the light refraction device; and a liquid crystal layer interposed between the first alignment layer and the light refracting lenses, and including liquid crystal molecules having an initial alignment direction coincided with the direction of a groove and having a refractive index being the same as a refractive index of the light refraction device when an electric field is not applied to the liquid crystal layer, wherein when the electric field is applied to the liquid crystal layer, the light refractive index of the light refraction device is greater than that of the liquid crystal layer, wherein the light refraction device is a lenticular lens, wherein an end of the second alignment layer directly contacts the second electrode, and wherein the second alignment layer directly contacts the liquid crystal layer.

2. The liquid crystal panel of claim 1, wherein each of the light refracting lenses has a convex surface facing the surface of the first substrate.

3. The liquid crystal panel of claim 1, wherein the light refracting lenses are parallel with each other and extend along and extend along a first direction.

4. The liquid crystal panel of claim 3, wherein the first direction is a vertical direction.

5. The liquid crystal panel of claim 3, wherein an alignment direction of liquid crystal molecules in the liquid crystal layer coincides with first direction.

6. The liquid crystal panel of claim 1, wherein the first electrode is located on substantially the entire surface of the first substrate.

7. The liquid crystal panel of claim 1, further comprising a power supply connected to the first and second electrodes for selectively applying the electric field to the liquid crystal layer, wherein a refractive index of the liquid crystal layer is substantially the same as or different from a refractive index of the light refraction device depending on whether the electric field is applied, wherein an initial alignment direction of liquid crystal molecules coincides with an extending direction of the light refracting lenses, and the liquid crystal molecules are erected between the first and second substrates when a voltage is applied to the first and second electrodes.

8. The liquid crystal panel of claim 7, wherein when the electric field is not applied to the liquid crystal layer, the refractive index of the liquid crystal layer is substantially the same as the refractive index of the light refraction device, and when the electric field is applied to the liquid crystal layer, the refractive index of the liquid crystal layer is different from the refractive index of the light refraction device.

9. The liquid crystal panel of claim 7, wherein the power supply selectively applies a voltage between the first electrode and the second electrode to generate the electric field.

10. A display device for selectively displaying one of a two-dimensional image and a three-dimensional image, comprising;

a flat panel display for displaying at least one image; and a two/three-dimensional image panel, the two/three-dimensional image panel either refracting the at least one image from the flat panel display to display the three-dimensional image or passing the at least one image from the flat panel display to display the two-dimensional image, depending on whether an electric field is applied to the two/three-dimensional image panel, the two/three-dimensional image panel includes:

a first substrate and a second substrate facing each other;

a first electrode on an inner surface of the first substrate;

a light refraction device on an inner surface of the second substrate, the light refraction device including a plurality of light refracting lenses facing the first electrode, wherein each of the plurality of light refracting lenses includes a part-cylindrical lens, the part-cylindrical lens having a convex top surface and a substantially flat bottom surface, the convex top surface facing the inner surface of the first substrate, and the substantially flat bottom surface facing the second substrate;

a second electrode formed between the second substrate and the light refraction device;

a first alignment layer formed on a surface of the first electrode;

a second alignment layer formed along the convex top surfaces of the plurality of part-cylindrical lens of the plurality of light refracting lenses, and having an outer surface facing the inner surface of first substrate, wherein the outer surface of the second alignment layer has a plurality of convex portions that face the first substrate; and a liquid crystal layer interposed between the first alignment layer and the light refracting lenses, and including liquid crystal molecules having an initial alignment direction coincided with the direction of a groove and having a refractive index being the same as a refractive index of the light refraction device when the electric field is not applied to the liquid crystal layer, wherein when the electric field is applied to the liquid crystal layer, the light refractive index of the light refraction device is greater than that of the liquid crystal layer, wherein the light refraction device is a lenticular lens, wherein an end of the second alignment layer directly contacts the second electrode, and wherein the second alignment layer directly contacts the liquid crystal layer.

11. The display device of claim 10, wherein the two/three dimensional image panel includes an image refraction layer for either refracting the at least one image within the image refraction layer or transmitting the at least one image within the image refraction layer without refraction, depending on whether the electric field is applied to the image refraction layer.

12. The display device of claim 11, further comprising a power supply for selectively applying the electric field to the image refraction layer depending on whether to display the two-dimensional image or the three dimensional image.

13. The display device of claim 10, wherein each of the light refracting lenses has a convex surface facing away from the flat panel display.

14. The display device of claim 10, wherein the light refracting lenses are parallel with each other and extend along a first direction.

15. The display device of claim 14, the first direction is a vertical direction.

16. The display device of claim 10, wherein a refractive index of the liquid crystal layer is substantially the same as or different from a refractive index of the light refraction device depending on whether the electric field is applied to the liquid crystal layer.

17. The display device of claim 10, wherein when the electric field is not applied to the liquid crystal layer, the refractive index of the liquid crystal layer is substantially the same as the refractive index of the light refraction device such that no refraction occurs to the at least image from the flat panel display at an interface between the light refraction device and the liquid crystal layer, and when the electric field is applied to the liquid crystal layer, the refractive index of the liquid crystal layer is different from the refractive index of the light refraction device such that at least one image from the flat panel display is refracted at the interface between the light refraction device and the liquid crystal layer.

18. The display device of claim 10, wherein the two/three dimensional image panel further includes a second electrode on substantially an entire surface of the second substrate, and a voltage being applicable between the first electrode and the second to generated the electric field.

19. The display device of claim 10, wherein the flat panel display is selected from the group consisting of an LCD (Liquid crystal display device), a PDP (plasma display panel), a FED (field emission display device), and an organic EL (electro-luminance) panel.

\* \* \* \* \*